US010794002B2

(12) United States Patent
Bilodeau et al.

(10) Patent No.: US 10,794,002 B2
(45) Date of Patent: Oct. 6, 2020

(54) METHODS FOR THE PRODUCTION OF HIGH SOLIDS NANOCELLULOSE

(71) Applicant: University of Maine System Board of Trustees, Bangor, ME (US)

(72) Inventors: Michael Bilodeau, Brewer, ME (US); Jonathan Spender, Enfield, ME (US); Adriaan Van Heiningen, Orono, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 15/567,478

(22) PCT Filed: Apr. 22, 2016

(86) PCT No.: PCT/US2016/029027
§ 371 (c)(1),
(2) Date: Oct. 18, 2017

(87) PCT Pub. No.: WO2016/172616
PCT Pub. Date: Oct. 27, 2016

(65) Prior Publication Data
US 2018/0094383 A1 Apr. 5, 2018

Related U.S. Application Data

(60) Provisional application No. 62/151,795, filed on Apr. 23, 2015.

(51) Int. Cl.
*D21C 3/20* (2006.01)
*D21C 9/18* (2006.01)
(Continued)

(52) U.S. Cl.
CPC ............... *D21C 3/20* (2013.01); *D21C 9/005* (2013.01); *D21C 9/007* (2013.01); *D21C 9/18* (2013.01); *D21H 11/18* (2013.01)

(58) Field of Classification Search
None
See application file for complete search history.

(56) References Cited

U.S. PATENT DOCUMENTS

| 7,381,294 | B2 | 6/2008 | Suzuki et al. |
| 8,372,320 | B2 | 2/2013 | Gardner et al. |

(Continued)

FOREIGN PATENT DOCUMENTS

| EP | 2196579 A1 | 6/2010 |
| WO | WO-2010/066905 A1 | 6/2010 |

(Continued)

OTHER PUBLICATIONS

International Search Report for PCT/US2016/029027, 3 pages (Jul. 26, 2016).

(Continued)

*Primary Examiner* — Jacob T Minskey
(74) *Attorney, Agent, or Firm* — Choate Hall & Stewart, LLP; Brian E. Reese; Meaghan E. Bychowski (57) ABSTRACT

The present invention provides, among other things, methods including the steps of providing a cellulosic biomass, associating the cellulosic biomass with an organic liquid to form a mixture, treating the mixture to reduce the moisture content of the mixture to 30% or below (if necessary), and processing the mixture to produce cellulose nanofibrils in a slurry. In some embodiments, provided methods allow for the production of high solids content slurries containing 4% or more cellulosic nanofibrils.

21 Claims, 1 Drawing Sheet

(51) Int. Cl.
*D21H 11/18* (2006.01)
*D21C 9/00* (2006.01)

(56) References Cited

U.S. PATENT DOCUMENTS

| | | | |
|---|---|---|---|
| 2013/0345416 A1* | 12/2013 | Laukkanen | B01J 13/0069 |
| | | | 536/85 |
| 2014/0057105 A1 | 2/2014 | Pande et al. | |
| 2014/0287470 A1* | 9/2014 | Medoff | B01J 19/085 |
| | | | 435/99 |
| 2014/0329094 A1 | 11/2014 | Vehniainen et al. | |
| 2014/0374045 A1* | 12/2014 | Nuopponen | D21C 9/007 |
| | | | 162/181.2 |

FOREIGN PATENT DOCUMENTS

| | | |
|---|---|---|
| WO | WO-2013/188657 A1 | 12/2013 |
| WO | WO-2015/171714 A1 | 11/2015 |

OTHER PUBLICATIONS

Lavrykova-Marrian, N. and Ramarao, B. V., Characterizing the drainage resistance of pulp and microfibrillar suspensions using hydrodynamic flow measurements, TAPPI'S PaperCon 2012, 948-985 (2012).

Written Opinion for PCT/US2016/029027, 6 pages (Jul. 26, 2016).

\* cited by examiner

METHODS FOR THE PRODUCTION OF HIGH SOLIDS NANOCELLULOSE

BACKGROUND

Nanofibrillated cellulose has found commercial use in several fields of endeavor including the paper and paperboard industry as a strength enhancing additive, the personal care industry as an absorbent and/or antimicrobial additive, and the food industry as a thickener. However, despite the desirability of nanofibrillated cellulose (sometimes referred to as "nanocellulose" or "cellulose nanofibrils"), use is curtailed due to the significant expense in transporting the material, due at least in part to a limitation on the ability to concentrate the material effectively.

SUMMARY OF THE INVENTION

The present invention, according to various embodiments, provides methods allowing for improved processing and concentration of cellulose nanofibrils/nanocellulose beyond what was possible using previously known techniques. Specifically, in some embodiments, provided methods allow for the concentration of nanocellulose to levels not previously observed in the art (e.g. 4 wt % nanocellulose solids or higher, for example, in a fluid medium). In part, provided methods encompass a recognition that once nanocellulose is exposed to significant amounts of water, attempts to dry it will result in irreversible agglomeration or hornification, including the formation of a hard plastic-like substance.

In some embodiments, the present invention provides, inter alia, methods including the steps of providing a cellulosic biomass, associating the cellulosic biomass with a first organic liquid to form a mixture, treating the mixture to reduce the moisture content of the mixture to 30% or below (if necessary), and processing the mixture to produce cellulose nanofibrils in a slurry. In some embodiments, the moisture content of the mixture is reduced to 25% 20%, 15%, 10%, 5% or less prior to the processing step. In some embodiments, the first and/or second organic liquid is or comprises a monomer.

In some embodiments the present invention provides methods including the steps of providing a cellulosic biomass, associating the cellulosic biomass with a first organic liquid to form a mixture, treating the mixture to reduce the moisture content of the mixture to 30% or below (if necessary), processing the mixture to produce cellulose nanofibrils in a slurry, and associating the slurry with a second organic liquid and/or water to form a high solids nanocellulosic slurry. In some embodiments, the moisture content of the mixture is reduced to 25% 20%, 15%, 10%, 5% or less prior to the processing step. In some embodiments, at least 10% (e.g., at least 15%, 20%, 35%, 30%, 40%, 50%, 60%, 70%, 80%, or more) of the first organic liquid is removed from the slurry before association with the second organic liquid. In some embodiments, provided methods further comprise filtering the high solids nanocellulosic slurry to form a high solids nanocellulosic material. In some embodiments, the removing step results in removal of at least 80% of first organic liquid. In some embodiments, the removing and second associating steps are repeated at least once. In some embodiments, at least 90% of the first organic liquid is removed.

It is contemplated that various embodiments will include the use of a mixture (e.g., of a cellulosic biomass and at least one organic liquid) having a low moisture/water content. According to various embodiments, it is desirable that the moisture content of the mixture be at or below 30% at the time the processing step begins. Without wishing to be held to a particular theory, it is thought that ensuring that the moisture content of the mixture is low (i.e., less than 30%) before the initiation of the processing step is useful in preventing the agglomeration issues observed in the art using previously known techniques. In some embodiments, the moisture content of the mixture is less than 15% (e.g., less than 14%, 13%, 12%, 11%, 10%, 8%, 6%) at the time the processing step is initiated. In some embodiments, the moisture content of the mixture is less than 5% (e.g., less than 4%, 3%, 2%) at the time the processing step is initiated. In some embodiments, the moisture content of the mixture is less than 1% (e.g., less than 0.9%, 0.8%, 0.7%, 0.6%, 0.5%, 0.4%, 0.3%, 0.2%, 0.1%) at the time the processing step is initiated. In some embodiments, a mixture may have substantially no moisture content at the time the processing step is initiated.

According to various embodiments, any of a variety of organic liquids (e.g., first organic liquids, etc) may be used. In some embodiments, a first organic liquid has a boiling temperature of at least 100° C. In some embodiments, a first organic liquid is or comprises lactic acid, propylene glycol, glycerin, propionic acid, olive oil, linseed oil, ethylene glycol, and combinations thereof.

Also in accordance with various embodiments, any of a variety of second organic liquids may be used. In some embodiments, a second organic liquid may be any organic liquid that is miscible in the first organic liquid used in a particular application. In some embodiments, the second organic liquid is or comprises ethanol, methanol, isopropanol, n-butanol, formaldehyde, acetaldehyde, acetone, ethyl acetate, acetonitrile, and/or combinations thereof. In some embodiments, water may be substituted in place of the second organic liquid and/or used in conjunction with the second organic liquid. In some embodiments, the second organic liquid has a boiling point at least 3° C. lower (e.g., at least 4° C., 5° C., 10° C., 20° C., 25° C., 30° C., or more) than the first organic liquid. In some embodiments, the boiling point of the second organic liquid is at least 5° C. lower than the first organic liquid.

Various embodiments, may include any of a variety of forms of processing, according to the requirements of a particular application. In some embodiments, processing is or comprises one or more of grinding, refining, comminuting, electrospinning, extrusion, microfluidizing, sonication, ultrasonication, homogenization, and combinations thereof.

In some embodiments, provided methods may include one or more additional steps. In some embodiments, provided methods may further comprise heating the mixture to a temperature at or above the boiling point of the first and/or second organic liquids to produce substantially dry cellulose nanofibrils.

Various embodiments, may allow for the production of high solids density products (e.g., greater than 4 wt % nanocellulosic solids). In some embodiments, cellulose nanofibrils comprise at least 4 wt % (e.g., 5% 6%, 7%. 8%, 9%, 10%, 20%, 25% or more) of the slurry (e.g., a processed mixture of cellulosic biomass and at least one organic liquid).

Provided methods and compositions may also be used to produce any of a variety of improved polymeric compositions. For example, slurries produced in accordance with provided methods may be used in the production of polymeric compositions using any known method of such polymer production including, but not limited to free radical polymerization, addition or chain growth polymerization, coordination polymerization, condensation with or without ester exchange, step growth polymerization, and/or copolymerization. In accordance with various embodiments, by using provided methods and compositions to produce polymeric compositions, the polymeric compositions will enjoy one or more enhanced properties as a result of the increased amount of nanocellulose (e.g. greater than 4 wt %), improved distribution of nanocellulose throughout the polymeric composition, and/or absence of substantial absence of water. In some embodiments, nanocellulose is homogenously or substantially homogenously distributed in the polymeric composition. The degree of homogeneity may be characterized, inter alia, via electron microscopy (e.g., scanning electron microscopy). In some embodiments, the organic liquid(s) used do not substantially solubilize one or more of the monomers and/or polymers or monomer or polymer components used in a particular method. By way of non-limiting example, in some embodiments, provided slurries including cellulosic biomass and one or more organic liquid(s) may be polymerized directly without the need for a solubilized polymer that is added exogenously to a slurry. Additionally, in some embodiments, the organic liquid(s) may be selected for compatibility with the hydrophobic surface of the cellulose in the feedstock. Without wishing to be held to a particular theory, selection of the organic liquid(s) to be compatible with the hydrophilic surface of the cellulose may enhance dispersion of the CNF throughout the slurry. In particular, it is possible that as the polymerization progresses, and a more hydrophobic polymer is formed, this intimate mixing of the liquid/monomer acts a bridging agent between the hydrophobic polymer matrix and hydrophilic cellulose surface further improving the properties of the polymer composite.

In some embodiments, provided compositions including polymer compositions enjoy one or more enhanced mechanical properties. For example, in some embodiments, polymer compositions created in accordance with provided methods and compositions may enjoy increased or improved heat distortion temperature, impact resistance, tensile strength, tensile modulus, elongation at break, creep, toughness, barrier properties, and/or storage modulus, improved gas (for example, oxygen) and water and/or oxygen barrier properties in both dry and various humid conditions as compared to a polymer composite produced according to previous methods and/or polymer composites without nanocellulose distributed therein (e.g., substantially homogenously distributed). In some embodiments, polymer compositions created in accordance with provided methods and compositions may exhibit reduced water and/or oxygen permeability. In some embodiments, polymer compositions created in accordance with provided methods and compositions may exhibit reduced water and/or oxygen permeability by 50% or less (e.g., 40%, 30%, 20%, 10%, 5% or less) as compared to a polymer composite produced according to prior methods.

As used in this application, the terms "about" and "approximately" are used as equivalents. Any citations to publications, patents, or patent applications herein are incorporated by reference in their entirety. Any numerals used in this application with or without about/approximately are meant to cover any normal fluctuations appreciated by one of ordinary skill in the relevant art. Additionally, all numerical ranges are understood to include all possible incremental sub-ranges within the outer boundaries of a given range.

Other features, objects, and advantages of the present invention are apparent in the detailed description that follows. It should be understood, however, that the detailed description, while indicating embodiments of the present invention, is given by way of illustration only, not limitation. Various changes and modifications within the scope of the invention will become apparent to those skilled in the art from the detailed description.

BRIEF DESCRIPTION OF THE DRAWING

FIG. 1 shows a graph of energy consumption required to produce a certain proportion of fines for a given volume of material. This FIGURE shows, among other things, that use of an organic liquid as a solvent in the production of cellulose nanofibrils allows for the production of high degrees of fines at a lower energy cost as compared to previously known methods that used water as the solvent. It is of note that the solids content using an organic liquid (here propylene glycol) was 4%, as opposed to the water condition, which was only able to be processed at a maximum of 2% solids content.

DEFINITIONS

In order for the present invention to be more readily understood, certain terms are first defined below. Additional definitions for the following terms and other terms are set forth throughout the specification.

Approximately or about: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Cellulose Nanofibrils: As used herein, the term "cellulose nanofibrils" or "CNF" refers to the state of cellulosic material wherein at least 75% of the cellulosic material would be considered to be "fines". In some embodiments, the proportion of cellulosic material that may be considered fines may be much higher such as 80%, 85%, 90%, 95%, 99% or higher. In this disclosure, the terms "nanofibrils", nanocellulose, highly fibrillated cellulose, super-fibrillated cellulose are all considered synonymous with cellulose nanofibrils.

Fines: As used herein, the term "fines" refers to fibers with a length weighted fiber length of less than 0.2 mm. In some embodiments, "fines" may refer to a cellulosic material that has a diameter of between 5 nm-100 nm, inclusive, and has a high surface to volume ratio.

Organic Liquid: As used herein, the term "organic liquid" refers to any non-aqueous fluid containing carbon and is a liquid at the processing temperature. In some embodiments, an organic liquid is non-flammable and/or non-toxic.

Substantially: As used herein, the term "substantially" refers to the qualitative condition of exhibiting total or near-total extent or degree of a characteristic or property of interest. One of ordinary skill in the chemical arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

DETAILED DESCRIPTION OF CERTAIN EMBODIMENTS

The present invention provides, inter alia, new methods of producing cellulose nanofibrils in highly concentrated solutions or solids. Previously used processing methods were very limited in the amount of cellulose nanofibrils that could be produced in a given volume of reagent. The present invention encompasses the recognition of the source of a previously unappreciated problem, namely, that cellulose nanofibrils, upon exposure to significant amounts of water, will aggressively bond with the water and form a gel, making subsequent water removal difficult and expensive. Without wishing to be held to a particular theory, it is likely that the capillary and van der Waals forces generated during drying of cellulose nanofibrils in water draws the nanocellulose into close proximity with other cellulose nanofibrils and allows for the formation of strong hydrogen bonds, making redispersion difficult or impossible. In fact, production of cellulose nanofibrils using previous methods often resulted in the formation of a hard plastic-like substance upon drying of the material for use in some applications. Among the many benefits of the present invention, the avoidance of formation of such plastic-like material on drying is a very commercially relevant one.

In some embodiments, the present invention provides methods including the steps of providing a cellulosic biomass, associating the cellulosic biomass with a first organic liquid to form a mixture, treating the mixture to reduce the moisture content of the mixture to 30% or below (if necessary), and processing the mixture to produce cellulose nanofibrils in a slurry. In some embodiments, the moisture content of the mixture is reduced to 25% 20%, 15%, 10%, 5% or less prior to the processing step.

In some embodiments, the present invention provides methods which include the use of more than a single (i.e. first) organic liquid. For example, in some embodiments the present invention provides methods including the steps of providing a cellulosic biomass, associating the cellulosic biomass with a first organic liquid to form a mixture, treating the mixture to reduce the moisture content of the mixture to 30% or below (if necessary), processing the mixture to produce cellulose nanofibrils in a slurry, and associating the slurry with a second organic liquid and/or water to form a high solids nanocellulosic slurry. In some embodiments, at least 10% (e.g., at least 15%, 20%, 35%, 30%, 40%, 50%, 60%, 70%, 80%, or more) of the first organic liquid is removed from the slurry before association with the second organic liquid. In some embodiments, the second organic liquid may be replaced in whole or in part with water. In some embodiments, provided methods further comprise filtering the high solids nanocellulosic slurry to form a high solids nanocellulosic material. In some embodiments, a high solids nanocellulosic material comprises between 10-20 wt % cellulose nanofibrils. In some embodiments, the removing step results in removal of at least 90% of first organic liquid. In some embodiments, the removing and second associating steps are repeated at least once. In some embodiments, at least 90% of the first organic liquid is removed.

Cellulosic Biomass

According to various embodiments, it is contemplated that any of a variety of forms of cellulosic biomass will be used. While any cellulosic biomass may be used in accordance with some embodiments, the following non-limiting examples are provided to aid in envisioning a genus of cellulosic biomass: wood, wood waste, spent pulping/fractionation liquors, algal biomass, food waste, grasses, straw, corn stover, corn fiber, agricultural products and residuals, forest residuals, saw dust, wood shavings, sludges and municipal solid waste, bacterial cellulose and mixtures thereof.

Organic Liquids

As will become clear in reading the present disclosure, a wide variety of organic liquids are contemplated as useful in various embodiments. Because some embodiments of provided methods include the use of a single organic liquid, while others employ a plurality of organic liquids, the terms "first organic liquid" and "second organic liquid" are used throughout, even if only a single organic liquid is present in a particular embodiment, for clarity and consistency. This naming convention is contemplated as helpful to a reader, particularly where the first and second organic liquids may have different required and/or desired properties (and thus comprise different genera of organic liquids). In some embodiments, the first and/or second organic liquid is or comprises a monomer.

First Organic Liquids

According to various embodiments, any of a variety of first organic liquids may be used. In some embodiments, a first organic liquid has a boiling temperature of at least 100° C. (e.g., at least 125° C., 150° C., 175° C., 200° C., 225° C., 250° C., 275° C., 300° C., or higher). In some embodiments, a first organic liquid is or comprises lactic acid, propylene glycol, glycerin, propionic acid, olive oil, linseed oil, ethylene glycol, oleic acid, dipropylene glycol, 1,3 propanediol, and combinations thereof. In some embodiments, the first organic liquid is non-flammable and/or has low toxicity.

Second Organic Liquids

Also in accordance with various embodiments, any of a variety of second organic liquids may be used. In some embodiments, a second organic liquid may be any organic liquid that is miscible in the first organic liquid used in a particular application. In some embodiments, the second organic liquid is or comprises ethanol, methanol, isopropanol, n-butanol, formaldehyde, acetaldehyde, acetone, ethyl acetate, acetonitrile, and/or combinations thereof. In some embodiments, water may be substituted in place of the second organic liquid and/or used in conjunction with the second organic liquid. In some embodiments, the second organic liquid has a boiling point at least 3° C. lower (e.g., at least 4° C., 5° C., 10° C., 20° C., 25° C., 30° C., 40° C., 50° C., 60° C., 70° C., 80° C., 90° C., 100° C., or more) than the first organic liquid. In some embodiments, the boiling point of the second organic liquid is at least 5° C. lower than the first organic liquid.

Associating

According to various embodiments, one or more forms of cellulosic biomass may be associated with a first organic liquid in any application-appropriate manner, with certain examples being shown in the Examples below. In some embodiments, associating will be or comprise: simple mixing of the organic liquid(s) and biomass. In some embodiments, associating the organic liquid(s) with biomass under high shear, kneading, extruding or folding conditions may be beneficial.

Moisture Content and Treating

It is contemplated that various embodiments will include the use of a biomass and/or mixture having a low moisture/water content (i.e. less than 30% moisture content), which may be advantageous in some embodiments. For example, in some embodiments, the moisture content of the mixture is less than 15% (e.g., less than 14%, 13%, 12%, 11%, 10%, 8%, 6%) at the time the processing step is initiated. For example, in some embodiments, the moisture content of the mixture is less than 5% (e.g., less than 4%, 3%, 2%) at the time the processing step is initiated. In some embodiments, the moisture content of the mixture is less than 1% (e.g., less than 0.9%, 0.8%, 0.7%, 0.6%, 0.5%, 0.4%, 0.3%, 0.2%, 0.1%) at the time the processing step is initiated. In some embodiments, a mixture may have substantially no moisture content at the time the processing step is initiated.

However, in some embodiments, the mixture of cellulosic biomass and organic liquid(s) will comprise a high level of moisture which may interfere with processing the mixture in accordance with provided methods. Accordingly, in some embodiments where a mixture contains undesirable moisture, for example, greater than 30% moisture, some form of treatment will generally be performed on the mixture prior to processing. Those of skill in the art will recognize a variety of forms of treatment for lowering the water content of the mixture prior to processing. Non-limiting, exemplary forms of treatment compatible with some embodiments include: heating (e.g., using exposure to hot air), drum drying, vacuum drying, dielectric drying, freeze drying, supercritical drying (e.g., superheated steam drying), microwave drying and desiccation. In some embodiments, a mixture will be treated to lower the moisture content of the mixture to a level at or below 15%. In some embodiments, a mixture will be treated to lower the moisture content of the mixture to a level at or below 5%. In some embodiments, a mixture will be treated to lower the moisture content of the mixture to a level at or below 1%.

Processing

According to various embodiments, once a mixture has achieved a low moisture content (e.g., at or below 30%), any of a variety of processing methods may be applied to the treated mixture. Various embodiments, may include any of a variety of forms of processing, in accordance with the requirements of a particular application. In some embodiments, processing is or comprises one or more of grinding, refining, extruding, comminuting, microfluidizing, homogenization, and combinations thereof.

Certain exemplary processes for processing cellulosic materials to form cellulose nanofibrils may be found in PCT Application Publication No. WO 2013/188,657. Several non-limiting examples of processing useful in some embodiments of the present invention are provided below and in the Examples section. It is Applicants intention not to be bound solely to these specific processing methodologies.

Processing Example—Comminution

In some embodiments, the mixture comprising cellulosic biomass and first organic liquid is mechanically comminuted in any type of mill or device that grinds the cellulose fibers apart. Such mills are well known in the industry and include, without limitation, Valley beaters, single disk refiners, double disk refiners, conical refiners, including both wide angle and narrow angle, cylindrical refiners, homogenizers, microfluidizers, and other similar milling or grinding apparatus. These mechanical comminution devices need not be described in detail herein, since they are well described in the literature, for example, Smook, Gary A., Handbook for Pulp & Paper Technologists, Tappi Press, 1992 (especially Chapter 13). The nature of the grinding apparatus is not critical, although the results produced by each may not all be identical. Tappi standard T200 describes a procedure for mechanical processing of pulp using a beater. The process of mechanical breakdown, regardless of instrument type, is sometimes referred to in the literature as "refining" or "comminution."

The extent of comminution may be monitored during the process in any of several ways. For example, in some embodiments, optical instruments may provide continuous data relating to the fiber length distributions and % fines, either of which may be used to define endpoints for the processing stage. Such instruments are often employed as industry standard testers, such as the TechPap Morphi Fiber Length Analyzer. Generally, as fiber length decreases, the % fines increases. Any suitable value may be selected as an endpoint, for example at least 80% tines. Alternative endpoints may include, for example 75% fines, 85% fines, 90% fines, 95% fines, 99% fines, etc. Similarly, endpoint fiber lengths of less than 10 mm or less than 0.5 mm or less than 0.2 mm or less than 0.1 mm may be used, as may ranges using any of these values or intermediate ones. Length may be taken as average length, median (50% decile) length or any other decile length, such as 90% less than, 80% less than, 70% less than, etc. for any given length specified above. The slurry viscosity (as distinct from pulp viscosity) may also be used as an endpoint to monitor the effectiveness of the mechanical treatment in reducing the size of the cellulose fibers. Slurry viscosity may be measured in any convenient way, such as by Brookfield viscometer. The water retention value test (described in Tappi UM 256) or modified water retention value test proposed by Suzuki (U.S. Pat. No. 7,381,294) can also be used to monitor the effectiveness of the mechanical treatment. In addition, Pande and Marcoccia (US Patent Application US2014/0057105) suggest that the mechanical treatment process can be monitored by measuring the hydrodynamic specific surface area as measured using the procedure specified in "Characterizing the drainage resistance of pulp and microfibrillar suspensions using hydrodynamic flow measurements" by N. Lavrykova-Marrain and B. Ramarao, TAPPI's PaperCon 2012 Conference, available at www.tappi.org/Hide/Events/12PaperCon/Papers/12PAP 116.aspx.

Additional Steps

In some embodiments, provided methods may include one or more additional steps, including the addition of one or more additives, such as catalysts and initiators. Non-limiting examples of catalysts are copper, cobalt, tin based-compounds, Ziegler catalysts, and zeolites. Non-limiting examples of initiators (e.g., photo-initiators) include biphenyls, organic and inorganic peroxides, halogens, and azo compounds. In some embodiments, provided methods may further comprise heating the mixture to a temperature at or above the boiling point of the first and/or second organic liquids to produce substantially dry cellulose nanofibrils.

In some embodiments, one or more functionalization steps may be performed. According to various embodiments, functionalization may improve one or more physical (e.g., mechanical) characteristics making provided material suitable for a specific application. In some embodiments, functionalization may include one or more of alteration of the roughness, hydrophilicity, surface charge, surface energy, biocompatibility, and/or reactivity of provided material.

Figure 1:
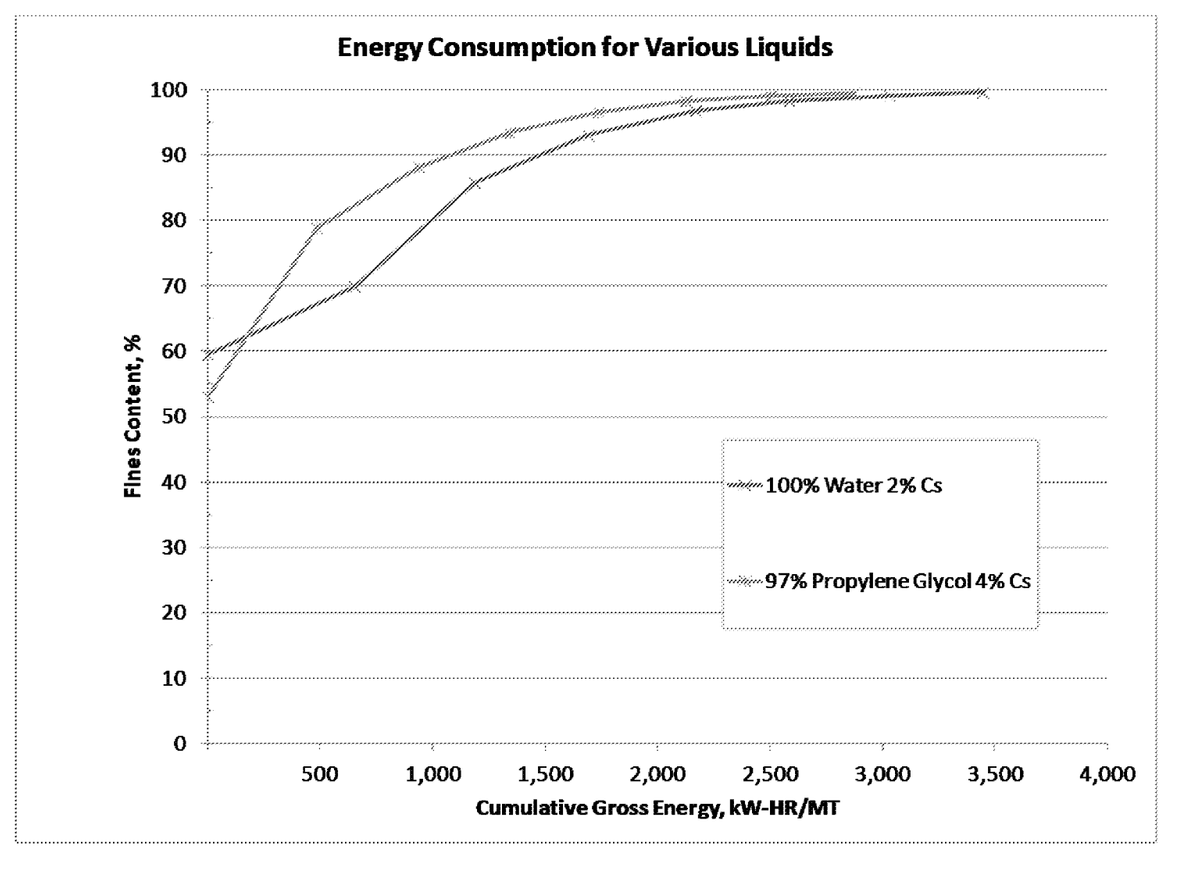

According to various embodiments, provided methods allow for the production of cellulose nanofibrils at a significantly lower level of energy consumption than would be required using previously known methods (see FIG. 1). In some embodiments, provided methods allow for the production of cellulose nanofibrils at energy consumption levels of at least about 2%, at least about 5%, at least about 8%, at least about 10%, at least about 15%, at least about 20% or at least about 25% lower as compared to energy consumption for comparable endpoint results without the use of provided methods (e.g., without the use of first organic liquid(s) and/or without lowering the moisture content of the mixture prior to processing). In other words, in some embodiments, the energy efficiency of the production of cellulose nanofibrils is improved by at least about 2%, at least about 5%, at least about 8%, at least about 10%, at least about 15%, at least about 20%, at least about 25%, or at least about 30% as compared to previously known methods.

In accordance with various embodiments, provided methods allow for the production of high solids density products that were unobtainable using previously known methods (e.g., greater than 4 wt % nanocellulosic solids). In some embodiments, cellulose nanofibrils comprise at least 4 wt % (e.g., 5% 6%, 7%. 8%, 9%, 10%, 20%, 25% or more) of the end slurry of a provided method. The production of such high solids content slurries allows for many commercially advantageous products to be generated including both high solids content liquids and solids or gels. As used herein, the term "high solids content" refers to a mixture and/or slurry comprising 4% or greater (e.g., 5% 6%, 7%. 8%, 9%, 10%, 20%, 25% or more) cellulose nanofibrils.

Polymer Compositions

Provided herein are methods and compositions which may be used to form any of a variety of polymeric compositions. In accordance with various embodiments, such polymeric compositions enjoy at least one enhanced property. Without wishing to be held to a particular theory, in some embodiments, by using provided methods and compositions to produce polymeric compositions, the polymeric compositions will enjoy one or more enhanced properties as a result of the increased amount of nanocellulose (e.g. greater than 4 wt %), improved distribution of nanocellulose throughout the polymeric compound, and/or absence of substantial absence of water. In some embodiments, slurries produced in accordance with provided methods may be used in the production of polymeric compounds using any known method of such polymer production including, but not limited to free radical polymerization, addition or chain growth polymerization, coordination polymerization, condensation or step growth polymerization, and/or copolymerization, In some embodiments, nanocellulose (e.g., cellulose nanofibrils) is homogenously or substantially homogenously distributed in the polymeric compound.

In addition the use of one or more additives as described above, one or more additives and./or other materials may be used to further enhance polymer compositions produced using one or more provided methods and/or compositions. One of skill in polymer chemistry will be able to envision how such additional material(s) may be used.

By way of specific example only, polymeric compositions that may be produced in accordance with the methods and compositions provided herein include, but are not limited to, polylactic acid (PLA), polyethylene terephthalate (PET), polybutylene succinate (PBS), polyethylene furanoate (PEF), Exemplary organic liquids (e.g., first organic liquids) that may be used in provided methods to produce improved polymer compositions are shown in Table 1 below:

TABLE 1

| Exemplary Organic Liquids and Polymer Compositions Producible Therewith | |
|---|---|
| Organic Liquid/Monomer Liquid(s) Used | Exemplary Polymer Composition Produced |
| Lactic Acid | Polylactic acid |
| Succinic acid + 1,4 butane diol | Polybutylene succinate |
| Ethylene glycol + terephthalic acid | Polyethylene terephthalate |

TABLE 1-continued

| Exemplary Organic Liquids and Polymer Compositions Producible Therewith | |
|---|---|
| Organic Liquid/Monomer Liquid(s) Used | Exemplary Polymer Composition Produced |
| Ethylene glycol + furandicarboxylic acid (FDCA) | Polyethylene furanoate |

Thus, as evidenced by herein, and in accordance with various embodiments, processing (e.g., refining) may be done in a monomeric liquid of a diol type (two alcohol groups), diacid type (two acid groups), diamine type (two amine groups) and/or combinations of these (such as lactic acid) leading to polymers such as polyesters, polyamides and epoxies. Other polymers are possible as long as the monomer liquid used for processing has hydrogen or other complexation capabilities (e.g., such as esterification) with the cellulosic biomass (e.g., lignocellulosic material) used for producing nanocellulose/CNF dispersed in a polymer matrix. One of skill reading the present disclosure will envision additional polymer composites achievable through application of provided methods using no more than routine experimentation/optimization.

In some embodiments, provided compositions including polymer compositions enjoy one or more enhanced mechanical properties. For example, in some embodiments, polymer compositions created in accordance with provided methods and compositions may enjoy increased or improved heat distortion temperature, impact resistance, tensile strength, tensile modulus, elongation at break, creep, toughness, barrier properties (e.g., water and/or oxygen barrier properties), and/or storage modulus as compared to a polymer composite produced according to previous methods and/or polymer composites without nanocellulose distributed therein (e.g., substantially homogenously distributed).

In some embodiments, at least one mechanical property is enhanced by 5% or more (e.g., 10%, 20%, 30%, 40%, 50%, 60%, 70%, 80%, 90%, 100% or more) as compared to a polymer composite produced according to prior methods. In some embodiments, at least one mechanical property is enhanced by 5% or more (e.g., 10%, 20%, 30%, 40%, 50% 60%, 70%, 80%, 90%, 100%, 1000% or more) as compared to a polymer composite without nanocellulose distributed (e.g., substantially homogenously distributed) therein.

EXAMPLES

Below are several specific examples of some embodiments of the present invention. These examples are not meant to be limiting and one of skill in the art will envision several additional embodiments that may be applied using no more than routine experimentation.

Unless otherwise specified, Northern Bleached Softwood Kraft market pulp (SFK-90 manufactured by Resolute Forest Products, St. Felicien Quebec, Canada) was used as the fiber source for each of the Examples below.

Example 1—Previous Methods

In this Example, pulp sheets, with a nominal moisture content of 10%, were manually shredded and then disintegrated with a Thomas-Wiley Laboratory mill (Model No. 4) producing a fibrous powder. For each example, a total of 220 gms of the fibrous powder was dispersed in 10,780 grams of liquid, most commonly water, to form a uniform slurry with a consistency of 2.0% fiber. The slurry was then pumped through an ultrafine lab grinder (Masuko super mass colloider laboratory model). The slurry was continuously recirculated through the ultrafine lab grinder until a slurry of cellulose nanofibrils (CNF) with a fines content of approximately 85% or higher, as measured using a fiber morphology analyzer (TechPap Morphi Fiber Analyzer), was produced. The gap between the two ceramic grinding stones was manually adjusted throughout the process, typically for 2 hours or more, to maintain the gap between the stones as small as possible without clashing. Without wishing to be held to a particular theory, it is expected that this minimized the amount of energy required to produce a slurry of CNF. The slurry was cooled using a small, water-cooled heat exchanger to minimize evaporation of the liquid as the energy imparted to the slurry during the grinding process would have otherwise increased its temperature over time.

U.S. Provisional Patent Application No. 62/067,053 (Bilodeau and Paradis) teaches that this and similar processes, including refiner-based processes as described in U.S. Pat. No. 7,381,294 (Suzuki), produce an aqueous slurry of CNF with commercially useful properties. However, the low solids content of the final CNF slurry produced using these methods (1%-3% solids maximum) increases transportation costs and geographically limits the market area for this material to a relatively small distance from the point of manufacture.

Another limitation of these previous techniques is that many applications, such as polymer or resin reinforcement, requires the CNF to be in a dry form. Conventional drying techniques cause the CNF to irreversibly agglomerate, or hornify the nanofibrils, making redispersion of dried CNF very difficult resulting in a significant loss of performance. U.S. Pat. No. 8,372,320 (Gardner, et. al) teaches the use of a spray drying method to produce a dry CNF product that is not agglomerated and redispersable, but the capital and operating costs of spray drying are too high and are cost prohibitive for many applications. The freeze-drying and critical point drying techniques are also capable of producing a dry CNF product, but also suffer from high capital and operating costs.

In contrast, as will be shown by the Examples below, the present invention overcomes the limitations of the prior art and produces a readily redispersible, high solids CNF product that can be shipped economically great distances yet requires much less capital and operating costs to produce than current CNF production and drying methods.

Example 2—CNF Produced in 88 wt % Lactic Acid

In this example, CNF is produced using a mixture of 88 wt % lactic acid and 12 wt % water as the liquid phase in the slurry. 202 gms of SFK-90 fiber, otherwise prepared as described in Example 1, was dispersed in approximately 10,780 grams of the lactic acid/water mixture as the liquid phase to produce a 2% solids slurry. Table 2 show the increase in % fines as a function of time. The temperature of the slurry was also recorded.

TABLE 2

Production of CNF using 2% SFK-90 pulp in 88% Lactic Acid & 12% Water

| Time (minutes) | Temperature (C.) | % Fines |
| --- | --- | --- |
| 0 | 20 | 45.4 |
| 15 | 24 | 56.5 |
| 30 | 32 | 63.5 |
| 45 | 33 | 69.6 |
| 60 | 34 | 72.4 |
| 75 | 34 | 75.5 |
| 90 | 35 | 79.6 |
| 105 | 35 | 82.1 |
| 120 | 36 | 83.4 |
| 135 | 36 | 85.5 |

After the run, a sample of slurry was formed into a wet pad by mixing 200 grams of ethanol with 200 grams of slurry with a lab mixer (Silverson Hi Shear Lab Mixer Model L 5M) for about 25 seconds at approximately 5000 rpm. The mixture was the filtered through a Buchner funnel and filter paper forming a wet pad. This first filtrate was set aside for further analysis.

The newly formed pad was then added to an additional 200 grams of ethanol and mixed and filtered as described above. The second filtrate was set aside for further analysis.

The two filtrates and wet filter cake of nanocellulose were dried in an oven at 105° C. and the residual mass recorded. A 200 gram sample of slurry @ 2% fiber content would theoretically yield a total filtrate residual of 196 gms and a pad of nanocellulose with a mass of 4 grams, assuming complete separation and full recovery.

Three 200 gm samples of slurry were processed as described above and the mass of the filtrate residuals and dry weight of each pad is given in Table 3.

TABLE 3

Lactic Acid and CNF Recovery

|  | Sample 1 | Sample 2 | Sample 3 |
| --- | --- | --- | --- |
| Dry residue in First Filtrate (gms) | 185.4 | 184.2 | 184.0 |
| Dry residue in Second Filtrate (gms) | 9.9 | 9.9 | 10.2 |
| Dry mass in Filter Cake (gms) | 4.4 | 4.8 | 4.7 |
| Total dry mass recovered (gms) | 199.7 | 198.9 | 198.9 |

Example 3—CNF Produced in Lactic Acid

In this example, an 88% lactic acid/12% water mixture was placed in an oven at 110° C. until all of the water was evaporated. 195 grams of SFK-90 fiber, otherwise prepared as described above in Example 1, was blended with 9,880 grams of the dried lactic acid producing a 2% solids fiber slurry. The fiber slurry was then processed in the ultrafine grinder as in Example 1. Table 4 shows the increase in % fines as a function of time. The temperature of the slurry was also recorded.

TABLE 4

Production of CNF using 2% SFK-90 pulp in 100% Lactic Acid

| Time (minutes) | Temperature (° C.) | % Fines |
| --- | --- | --- |
| 0 | 20 | 45.8 |
| 15 | 44 | 64.2 |
| 30 | 53 | 74 |
| 45 | 58 | 77.2 |
| 60 | 61 | 81.7 |
| 75 | 62 | 85.2 |
| 90 | 63 | 86.7 |
| 105 | 65 | 88.1 |
| 120 | 67 | 90.1 |
| 135 | 70 | 90.7 |

After the run, a sample of slurry was formed into a wet pad by mixing 200 grams of ethanol with 200 grams of slurry with a lab mixer (Silverson Hi Shear Lab Mixer Model L 5M) for about 25 seconds at approximately 5000 rpm. The mixture was the filtered through a Buchner funnel and filter paper forming a wet pad. This first filtrate was set aside for further analysis.

The newly formed pad was then added to an additional 200 grams of ethanol and mixed and filtered as described above. The second filtrate was set aside for further analysis.

The two filtrates and wet filter cake of nanocellulose were dried in an oven at 105° C. and the residual mass recorded. A 200 gram sample of slurry @ 2% fiber content would theoretically yield a total filtrate residual of 196 grams and a pad of nanocellulose with a mass of 4 grams, assuming complete separation and full recovery.

Three 200 gm samples of slurry were processed as described above and the mass of the filtrate residuals and dry weight of each pad is given in Table 5.

TABLE 5

Lactic Acid and CNF Recovery

|  | Sample 1 | Sample 2 | Sample 3 |
| --- | --- | --- | --- |
| Dry residue in First Filtrate (gms) | 186.4 | 185.7 | 187.0 |
| Dry residue in Second Filtrate (gms) | 9.5 | 9.9 | 8.7 |
| Dry mass in Filter Cake (gms) | 4.1 | 4.1 | 4.2 |
| Total dry mass recovered (gms) | 200.0 | 199.7 | 199.9 |

Example 4—CNF Produced in Propylene Glycol

In this example propylene glycol was used as the liquid phase in the slurry. 220 gms of SFK-90 fiber, otherwise prepared as described above in Example 1, was dispersed in approximately 10,900 grams of propylene glycol to produce a 2% solids slurry. The slurry was then processed through an ultrafine grinder as described in Example 1. Table 6 show the increase in % fines as a function of time and gross energy applied for this slurry.

TABLE 6

Production of CNF using 2% SFK-90 pulp in 100% Propylene Glycol

| Time (minutes) | Temperature (° C.) | % Fines |
| --- | --- | --- |
| 0 | 18 | 56 |
| 15 | 33 | 57.3 |
| 30 | 39 | 69.4 |
| 45 | 40 | 76.1 |
| 60 | 40 | 78.8 |
| 75 | 41 | 81.7 |
| 90 | 42 | 84.9 |
| 105 | 42 | 87.1 |
| 120 | 42 | 88.8 |
| 135 | 42 | 90.8 |

In this Example, we have demonstrated that cellulose is capable of undergoing esterification with the lactic acid. However no such reaction pathway is known with the alcohol.

After the run, a sample of slurry was formed into a wet pad by mixing 200 grams of ethanol with 200 grams of slurry with a lab mixer (Silverson Hi Shear Lab Mixer Model L 5M) for about 25 seconds at approximately 5000 rpm. The mixture was the filtered through a Buchner funnel and filter paper forming a wet pad. This first filtrate was set aside for further analysis.

The newly formed pad was then added to an additional 200 grams of ethanol and mixed and filtered as described above. The second filtrate was set aside for further analysis.

The two filtrates and wet filter cake of nanocellulose were dried in an oven at 105° C. and the residual mass recorded. A 200 gram sample of slurry @ 2% fiber content would theoretically yield a total filtrate residual of 196 grams and a pad of nanocellulose with a mass of 4 grams, assuming complete separation and full recovery.

Three 200 gm samples of slurry were processed as described above and the mass of the filtrate residuals and dry weight of each pad is given in Table 7.

TABLE 7

Propylene Glycol and CNF Recovery

|  | Sample 1 | Sample 2 | Sample 3 |
| --- | --- | --- | --- |
| Dry residue in First Filtrate (gms) | 180.0 | 178.1 | 181.6 |
| Dry residue in Second Filtrate (gms) | 16.2 | 17.1 | 15.8 |
| Dry mass in Filter Cake (gms) | 3.5 | 3.4 | 3.4 |
| Total dry mass recovered (gms) | 199.7 | 198.6 | 200.8 |

Example 5—Redispersion of CNF Produced in Various Liquid Phases

Nanocellulose was produced using four different liquid phases, as shown in Table 8, and the % fines measured as described in Example 1. The slurry samples were then dried in an oven at 105° C. The dry nanocellulose was then redispersed in 200 grams of water using a laboratory mixer (Silverson Hi Shear Lab Mixer Model L 5M) for 1 minute at 5000 rpm and the % fines measured in the mixed slurry. The nanocellulose sample produced in water was not sufficiently dispersed to analyze the sample in the fiber analyzer.

The other three samples of nanocellulose produced using this invention were readily redispersed as described in Table 8.

TABLE 8

Redispersion of Dried CNF Produced in Various Liquid Phases

| Sample | % Fines in slurry | % Fines after oven dried and redispersed |
|---|---|---|
| CNF made in water | 90.3 | Could not test |
| CNF made in 88% Lactic Acid | 85.5 | 85.8 |
| CNF made in 100% Lactic Acid | 90.7 | 91.1 |
| CNF made in Propylene glycol | 90.8 | 91.3 |

Example 6—Producing CNF in Water at 2% Solids

In this example of previously known methods, CNF is produced using water as the liquid phase in the slurry. 202 gms of SFK-90 fiber, prepared as described above in Example 1, was dispersed in approximately 9,100 grams of water to produce a 2% solids slurry. Note that a 4% solids slurry was attempted but could not be processed because of the high viscosity of the slurry.

The slurry was then processed through an ultrafine grinder as described in Example 1. Table 9 shows the increase in % fines as a function of time and gross energy applied to the slurry. The temperature of the slurry was also recorded.

TABLE 9

Production of CNF using 2% SFK-90 pulp in Water

| Time (minutes) | Temperature (° C.) | % Fines | Cumulative Gross Energy (kW-hr/tone) |
|---|---|---|---|
| 0 | 17 | 59.5 | 0 |
| 15 | 19 | 69.9 | 480 |
| 30 | 19 | 85.7 | 880 |
| 45 | 19 | 93.0 | 1300 |
| 60 | 20 | 96.8 | 1700 |
| 75 | 20 | 98.3 | 2120 |
| 90 | 21 | 99.1 | 2540 |
| 105 | 22 | 99.5 | 2940 |

Example 7—Producing CNF in Propylene Glycol at 4% Solids

In this example, CNF is produced using propylene glycol as the liquid phase in the slurry. 384 grams of SFK-90 fiber, prepared as described in Example 6, was dispersed in approximately 8640 grams of propylene glycol to produce a 4% solids slurry.

The slurry was then processed through the ultrafine grinder as previously described. Table 10 shows the increase in % fines as a function of time and gross energy applied to the slurry. The temperature of the slurry was also recorded.

TABLE 10

Production of CNF using 4% SFK-90 pulp in Propylene Glycol

| Time (minutes) | Temperature (° C.) | % Fines | Cumulative Gross Energy (kW-hr/tonne) |
|---|---|---|---|
| 0 | 17 | 53.0 | 0 |
| 15 | 32 | 78.9 | 484 |
| 30 | 41 | 88.1 | 938 |
| 45 | 45 | 93.4 | 1,344 |
| 60 | 51 | 96.6 | 1,734 |
| 75 | 53 | 98.3 | 2,125 |
| 90 | 53 | 99.0 | 2,500 |
| 105 | 55 | 99.4 | 2,875 |

Conclusions

The % fines as a function of energy consumed from Examples 6 & 7 are presented in FIG. 1. A comparison of the two curves shows that CNF at 4% solids can be produced with less specific energy consumption (kW-Hr/MT) compared to CNF produced at 2% solids in water. This suggests that at least twice the throughput can be achieved with the invention compared to prior art for a given production unit and energy consumption on a dry weight basis, resulting in a more efficient process.

Example 8—Cellulose Nanofibrils (CNF) Dispersed in Polylactic Acid Polymer

In this example, CNF was generated from a mixture of lactic acid (88%) and water (12%) containing 3% bleached market pulp, by weight. This mixture was run through the Masuko Mass Colloider Grinder until a 94% fines level was achieved, as measured using the Tech Pap Morfi fiber analyzer. This material was placed in a vacuum oven and heat was applied to drive off the free water (approximately 95° C. for 2 hours). Subsequently, a vacuum was applied and the temperature slowly raised to about 140° C. to facilitate the removal of the water generated by the polymerization reaction. Most commercial, high molecular weight polylactic acid is generated by a lactide ring opening reaction which is well documented in the literature. In this example, a simple condensation reaction was used to generate lower molecular weight PLA oligomers containing a high concentration of well dispersed CNF.

EQUIVALENTS AND SCOPE

Those skilled in the art will recognize, or be able to ascertain using no more than routine experimentation, many equivalents to the specific embodiments of the invention described herein. The scope of the present invention is not intended to be limited to the above Description, but rather as set forth in the following claims:

We claim:

1. A method of producing a nanocellulose composite, the method comprising the steps of:
   (a) providing a cellulosic biomass, wherein the cellulosic biomass has a water content less than 30%;
   (b) associating the cellulosic biomass with a first organic liquid to form a first mixture, wherein the first organic liquid has a boiling temperature greater than 100° C., and wherein the first organic liquid comprises a monomer;
   (c) removing substantially all water from the first mixture;

(d) processing the first mixture to produce a slurry comprising cellulose nanofibrils and the first organic liquid;
(e) heating the first mixture to a temperature at or above the boiling temperature of the first organic liquid; and
(f) polymerizing the slurry,
thereby producing a nanocellulose composite comprising cellulose nanofibrils substantially homogenously distributed in a polymeric compound, wherein no exogenous water is added during the process after the initiation of step (b).

2. The method of claim 1, wherein the first organic liquid is or comprises lactic acid, propylene glycol, succinic acid, ethylene glycol, dipropylene glycol, 1,3, propanediol, a diol type monomer, a diacid type monomer, a diamine type monomer and combinations thereof.

3. The method of claim 1, wherein the cellulose nanofibrils comprise at least 4 wt % of the slurry.

4. The method of claim 1, wherein the polymerization is selected from the group consisting of free radical polymerization, addition or chain growth polymerization, coordination polymerization, condensation or step growth polymerization, and copolymerization.

5. The method of claim 1, wherein the slurry includes one or more additives.

6. The method of claim 5, wherein the additive is or comprises a catalyst and/or initiator.

7. A high solids nanocellulose composite produced according to the method of claim 1.

8. A method of producing a nanocellulose composite, the method comprising the steps of:
(a) providing a cellulosic biomass, wherein the cellulosic biomass has a water content less than 30%;
(b) associating the cellulosic biomass with a first organic liquid to form a first mixture, wherein the first organic liquid has a boiling temperature greater than 100° C., and wherein the first organic liquid comprises a monomer;
(c) removing substantially all water from the first mixture;
(d) processing the first mixture to produce a slurry comprising cellulose nanofibrils and the first organic liquid;
(e) heating the first mixture to a temperature at or above the boiling temperature of the first organic liquid; and
(f) associating the slurry with a second organic liquid to form a high solids nanocellulosic slurry; and
(g) polymerizing the high solids nanocellulosic slurry,
thereby producing a nanocellulose composite comprising cellulose nanofibrils substantially homogenously distributed in a polymeric compound, wherein no exogenous water is added during the process after the initiation of step (b).

9. The method of claim 8, wherein at least 10% of the first organic liquid is removed from the slurry before association with the second organic liquid.

10. The method of claim 8, further comprising filtering the high solids nanocellulosic slurry.

11. The method of claim 8, wherein the second organic liquid has a boiling point at least 3° C. lower than the first organic liquid.

12. The method of claim 8, wherein the second organic liquid is or comprises ethanol, methanol, isopropanol, n-butanol, formaldehyde, acetaldehyde, acetone, ethyl acetate, acetonitrile, and combinations thereof.

13. The method of claim 8, wherein the boiling point of the second organic liquid is at least 5° C. lower than the first organic liquid.

14. The method of claim 9, wherein the removing step results in removal of at least 90% of first organic liquid.

15. The method of claim 9, wherein the removing and second associating steps are repeated at least once.

16. The method of claim 15, wherein at least 90% of the first organic liquid is removed.

17. The method of claim 8, wherein the high solids nanocellulosic slurry comprises at least 4 wt % cellulosic solids.

18. The method of claim 8, wherein the polymerization is selected from the group consisting of free radical polymerization, addition or chain growth polymerization, coordination polymerization, condensation or step growth polymerization, and copolymerization.

19. The method of claim 8, wherein the slurry includes one or more additives.

20. The method of claim 19, wherein the additive is or comprises a catalyst and/or initiator.

21. A high solids nanocellulose composite produced according to the method of claim 8.

* * * * *